United States Patent [19]
Grice

[11] Patent Number: 6,151,826
[45] Date of Patent: Nov. 28, 2000

[54] LOCKED REEL SEAT

[75] Inventor: Steven L. Grice, Spirit Lake, Iowa

[73] Assignee: Berkley Inc., Spirit Lake, Iowa

[21] Appl. No.: 09/321,129

[22] Filed: May 27, 1999

Related U.S. Application Data

[60] Provisional application No. 60/086,752, May 27, 1998.

[51] Int. Cl.[7] ............................ A01K 87/00; A01K 87/06
[52] U.S. Cl. ......................................................... 43/22
[58] Field of Search ................................. 43/18.1, 22, 25

[56] References Cited

U.S. PATENT DOCUMENTS

| | | | |
|---|---|---|---|
| 1,745,398 | 2/1930 | Beaty | 43/22 |
| 1,980,316 | 11/1934 | Breder | 43/22 |
| 2,592,878 | 4/1952 | Esposito | 43/22 |
| 2,793,458 | 5/1957 | Stephens | 43/22 |
| 3,581,426 | 6/1971 | Miller | 43/22 |
| 3,811,215 | 5/1974 | Fleischer | 43/18.1 |
| 5,033,224 | 7/1991 | Wu-Hsi | 43/22 |
| 5,088,225 | 2/1992 | Yamamoto | 43/22 |

Primary Examiner—Kurt Rowan
Attorney, Agent, or Firm—Roylance, Abrams, Berdo & Goodman, L.L.P.

[57] ABSTRACT

A lockable reel seat system includes a reel seat body exhibiting: (a) a handle section having a rear reel seat cavity, a male threaded length with a circular cross sectional shape and a longitudinally extended central axis, and a pair of aligned grooves extending longitudinally within said threaded portion; (b) a foregrip or other form of forward member with a female threaded cavity that engages the threaded portion of the handle to allow the cavity to advance toward or retract from the rear reel seat cavity, a pair of holes aligned with the grooved in the threaded section; and (c) a curved saddle clip that fits over the foregrip or forward member and which has a pair of inwardly projecting pins that extend through the holes and engage the grooves.

When the saddle clip is engaged, the foregrip or forward member cannot be turned. This clip acts as a lock to secure the reel in the reel seat of a particular rod. The saddle clip also provides a consistently positioned surface on which any price tag or SKU codes can be placed to reflect the rod and reel combination.

4 Claims, 3 Drawing Sheets

LOCKED REEL SEAT

This application is a continuation-in-part of provisional application Ser. No. 60/086,752 that was filed on May 27, 1998 and whose disclosure is incorporated herein by reference.

FIELD OF THE INVENTION

The invention relates to a device and system for securing a fishing rod to a fishing reel for sale as a combination product in a retail environment.

BACKGROUND TECHNOLOGY

Consumers have shown a marked preference in retail stores for purchasing a combination product that includes a fishing rod and a fishing reel. This combination is often made at the manufacturing facility with the combination of a manually placed plastic band typically sold for permanently securing wires together and sealing the assembly with a layer of shrink wrap plastic film.

Unfortunately, many retail stores are operating at a level of clerk staffing that does not always permit a high degree of security in the fishing rod aisle. Some individuals will take this as an opportunity to exchange the reel originally packaged with a particular fishing rod and perform a self service upgrade. Cashiers may not notice the exchange because the price tag and bar code stock keeping unit (SKU) for the combination is attached to some location on the rod. The cashier will often allow the new combination to be sold for the originally planned price. This exchange results in a net loss of revenue to the store as well as the manufacturer.

It would be desirable to have a system for securing a designated fishing reel of standard configuration to a fishing rod in a manner that prevents disassembly or at least alerts the cashier of tampering.

SUMMARY OF THE INVENTION

It is an object of the invention to provide a device for securing a reel to a fishing rod reel seat in such a manner that tampering is prevented or at least readily detectable.

It is another object to provide an anti-tampering device for rod/reel combination products that provides a standardized location for the affixation of a price and bar code SKU.

In accordance with these and other objectives of the invention that will become apparent from the description herein, a rod/reel combination fastening system comprises:
(a) a handle section having: (i) a rear reel seat cavity member, (ii) a threaded portion with a series of raised threads along a longitudinally extended axis from a butt end of said handle section toward a tip end of said handle section, and (iii) a pair of grooves extending longitudinally through threads of said threaded portion;
(b) a forward member with: (i) a female threaded cavity that will engage the threaded portion of said handle section and (ii) a pair of holes in said forward member that are positioned to align with said grooves in the threaded portion of the handle; and
(c) a saddle clip curved to fit over said forward member and exhibiting a pair of projecting pins positioned to extend into said holes and engage said grooves in the threaded portion of the handle.

Optionally, the entire assembly is sealed in a clear plastic wrap that must be destroyed before the saddle clip can be removed. If the saddle clip pins are configured for permanent connection, the saddle clip must be detectably destroyed before the reel can be removed from the rod. The saddle clip also provides a consistently positioned surface on which any price tag or SKU codes can be placed to reflect the rod and reel combination.

DETAILED DESCRIPTION

Figure 1:
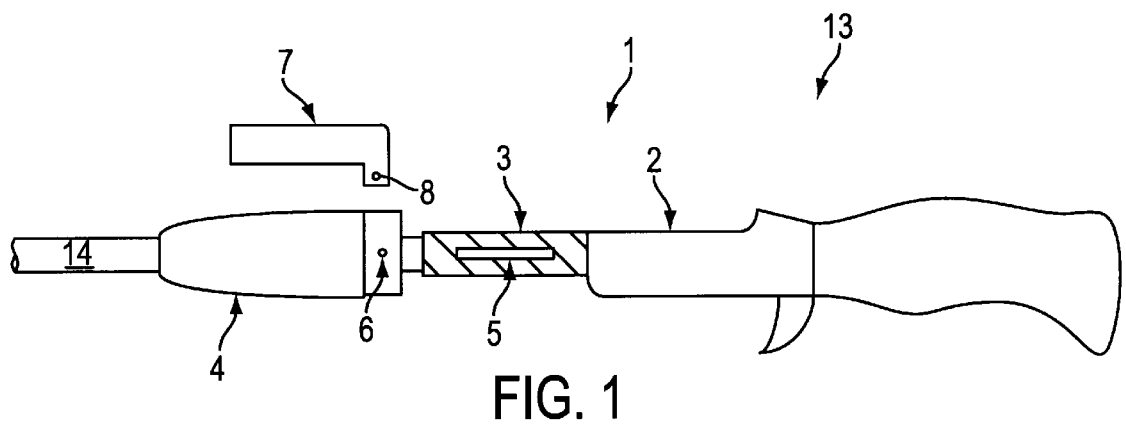
FIG. 1 illustrates an exploded view of the elements of the present invention with a reel seat for a bait casting reel
Figure 2:
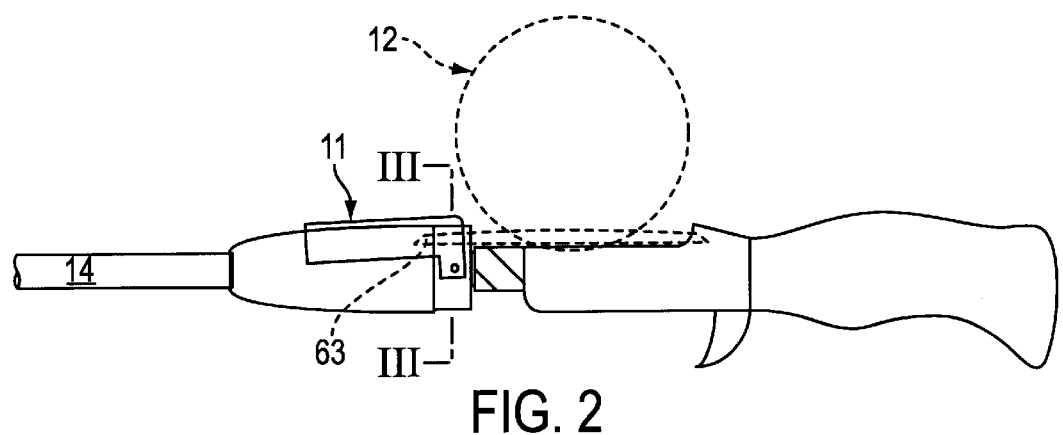
FIG. 2 depicts a casting or baitcast reel secured and locked in the reel seat.
Figure 4:
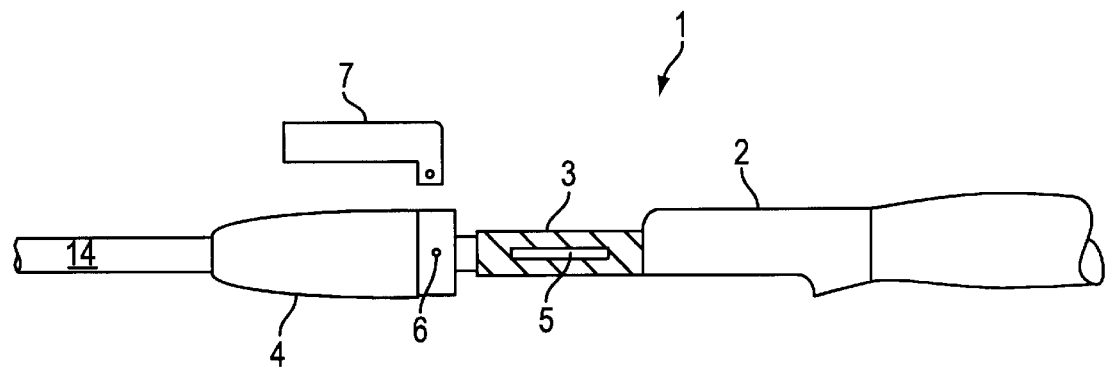
FIGS. 4 and 5 are sketches of the invention when used with a spinning reel.
Figure 5:
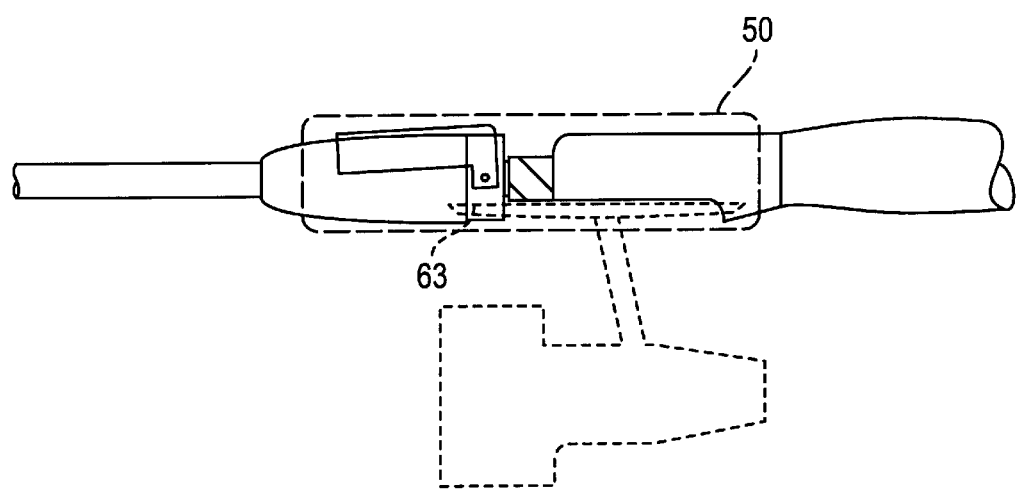
Figure 6:
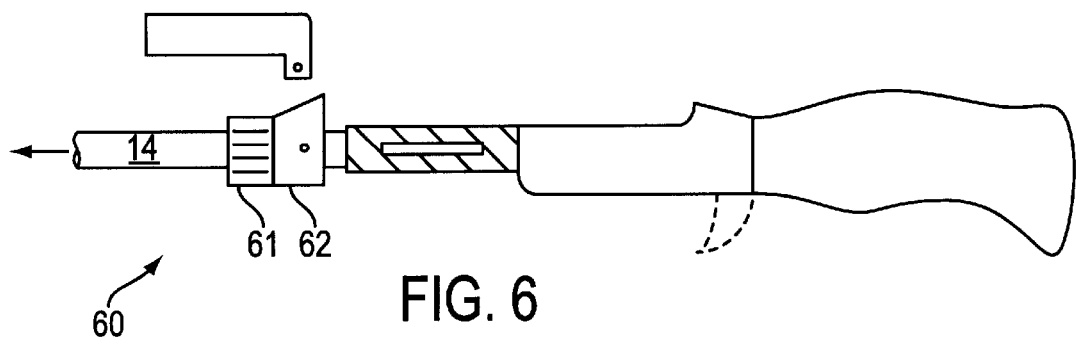
FIGS. 6 and 7 show use of the invention when the forward member does not include a foregrip handle.
Figure 7:
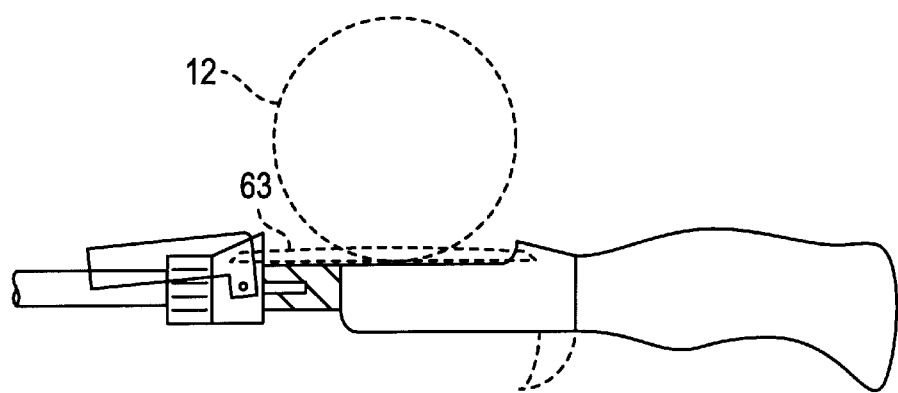

FIGS. 1, 4, and 6 illustrate exploded views of the lockable reel seat system of the invention with a baitcasting reel (FIGS. 1 and 2) a spin casting reel (FIGS. 4 and 5), and on a reel seat body that does not include a foregrip handle section (FIGS. 6 and 7). Similar elements will be designated with the same reference number to avoid confusion.

The invention relates to a locking clip to secure the reel seat elements used to secure a conventional fishing reel to a fishing rod. As shown, reel seat section 1 of a fishing rod handle is made of a rear reel foot seat 2 and a male threaded portion 3 extending therefrom. Reel seat section 1 typically is located on the tip end of handle 13 and is aligned with the longitudinal axis of rod 14. Consistent with typical construction, threaded portion 3 exhibits a circular cross sectional shape and external threads that are configured to engage a female threaded forward reel seat cavity (not shown) inside forward member 4.

In FIGS. 1 and 4, the forward member illustrated is a foregrip handle section that is designed to extend sufficiently far in front of the tip end of the reel to allow gripping by an angler. Often, the length of the foregrip is 5–20 cm. In FIGS. 6 and 7, forward member 60 is made of threaded nut 61 that is attached to cowling 62. Cowling 62 is shaped like a forward reel foot seat to engage and restrain the forward end of a conventional reel foot 63.

The present invention includes a pair (at 180° apart) and preferably two pair (at 90° apart) of oppositely disposed grooves 5 through the raised threads in a section of threaded portion 3 and, optionally, into the underlying material of reel seat section 1. Holes 6 in forward member 4 are aligned to allow access to grooves 5.

Saddle clip 7 has a pair of pins 8 that are sufficiently long to extend through forward member 4 and cushioning 9 into grooves 5. Pins 8 will secure forward member 4 in position around the forward reel foot 63. Reel 12 is retained in position and in combination with fishing rod 14 until saddle clip 7 is removed or broken. The absence of saddle clip 7 on a rod/reel combo is evidence of tampering that can be detected at a checkout stand.

Figure 3:
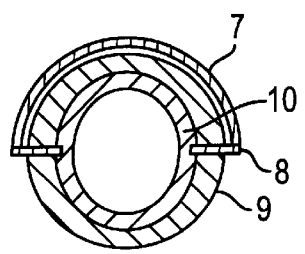
FIG. 3 shows a cross sectional view of the components along the rod axis when assembled.

Saddle clip 7 is generally curved to form a low profile fit over the foregrip or forward member. See, FIG. 3. As illustrated, saddle clip 7 has at least one pair of pins 8 extending inwardly from the inside surface of the curved clip. Saddle clip 7 also preferably has an extended section that provides a longitudinally elongated surface 11 on which price, product, inventory or other information can be affixed.

The entire combination can be further wrapped with a heat shrink film 50 for further security, if desired. Separation of the reel from the rod will, therefore, require removal of any shrink wrap film 50 and clip 7.

Upper surface 11 of saddle clip 7 also serves as a preferred place to attach a price tag or bar code SKU that pertains to the particular rod/reel combination. Because saddle clip 7 would have to be disengaged from forward member 4 to remove the reel, careful positioning of any such price tag or SKU can ensure that removal of saddle clip 7 will form visible indications of tampering with the original packaging.

Saddle clip 7 can be made of virtually any moldable material with a toughness adequate to flex as clip 7 is slipped over a forward member or foregrip, yet provide adequate toughness to remain secured in position. Suitable materials include nylon, reinforced nylon, polyethylene, and polypropylene.

Alternatively, protection against tampering with the clip can be achieved by forming the clip with a material that is sufficiently thin and brittle to break when flexed for removal. Fault lines and defect surfaces can be molded into the clip along a stress line during flexure that will break when the clip is flexed to extract pins 8 from holes 6. Such fault lines are preferably oriented to run the length of clip 7.

What is claimed is:

1. A lockable reel seat system that includes:

(a) a handle section having: (i) a rear reel seat cavity member, (ii) a threaded portion with a series of raised threads along a longitudinally extended axis from a butt end of said handle section toward a tip end of said handle section, and (iii) a pair of grooves extending longitudinally through threads of said threaded portion;

(b) a forward member with: (i) a threaded forward reel seat cavity that engages the threaded portion of said handle section and (ii) a pair of holes in said forward member that are aligned with said grooves in the threaded portion of the handle; and (c) a saddle clip that fits over said forward member and includes a pair of projecting pins extending into said holes and engaging said grooves.

2. A reel system according to claim 1 wherein said forward member is a foregrip.

3. A reel system according to claim 1 wherein said saddle clip is made of nylon, reinforced nylon, polyethylene, or polypropylene.

4. A rod and reel combination including a fishing reel with a front reel foot and a rear reel foot, a fishing rod blank, and a locking system that comprises:

(a) a handle section connected to said fishing rod blank and having: (i) a rear reel seat cavity member that secures said rear reel foot, (ii) a threaded portion with a series of raised threads along a longitudinally extended axis from a butt end of said handle section toward a tip end of said handle section, and (iii) a pair of grooves extending longitudinally through threads of said threaded portion;

(b) a forward member with: (i) a threaded forward reel seat cavity that engages the threaded portion of said handle section and secures said forward reel foot, and (ii) a pair of holes in said forward member that are aligned with said grooves in the threaded portion of the handle; and (c) a saddle clip that includes a pair of projecting pins extending into said holes and engaging said grooves, whereby said forward reel seat cavity is secured in said handle section and to said fishing rod blank.

* * * * *